Figure 1:
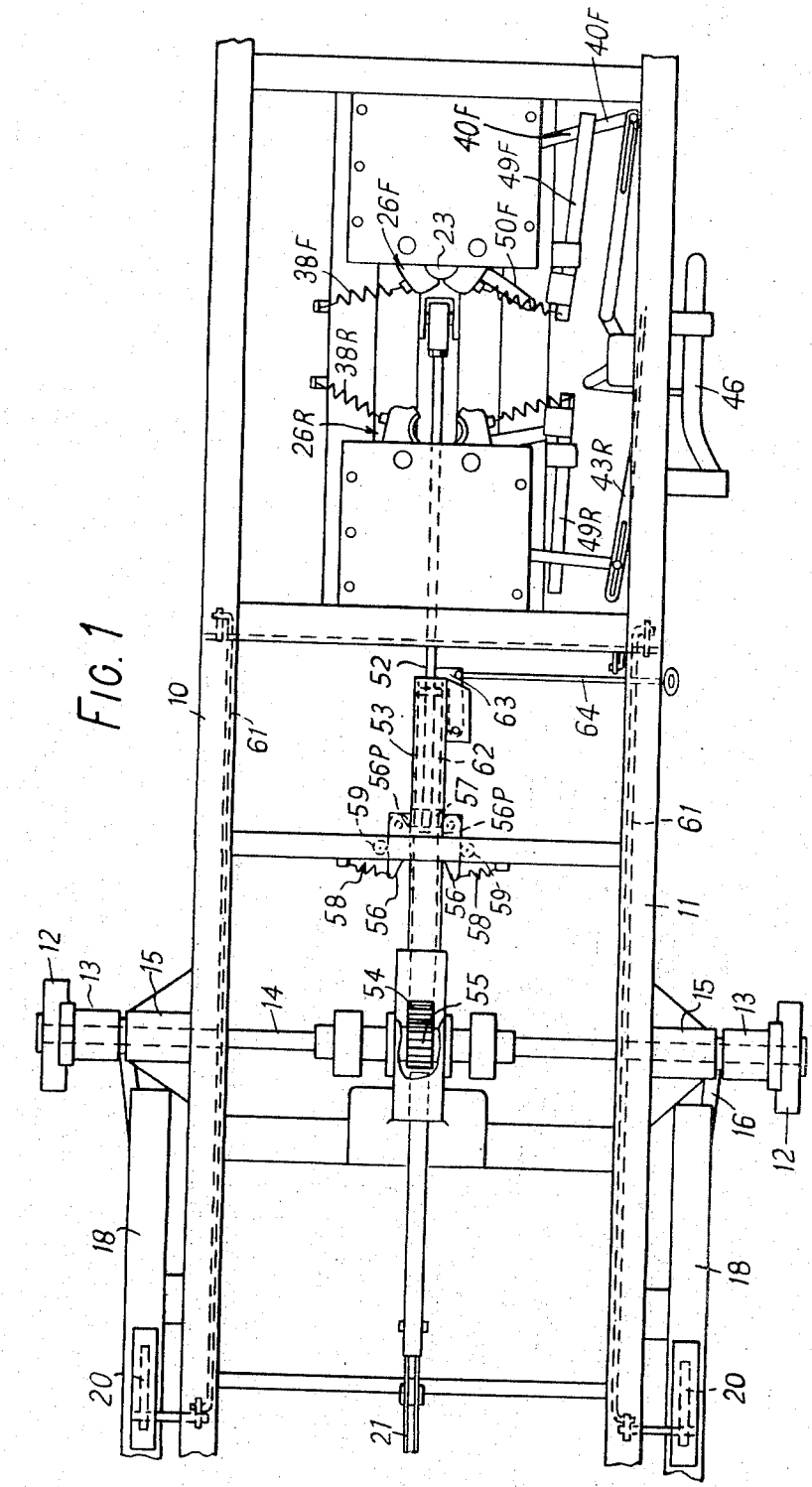

United States Patent [19]
Davis

[11] 3,790,190
[45] Feb. 5, 1974

[54] KING-PIN ACTUATED LANDING GEAR FOR ROAD-HAULAGE SEMI-TRAILERS

[76] Inventor: Carlton John Davis, 101, Chesterfield Rd., Leyton, London, England

[22] Filed: Apr. 13, 1972

[21] Appl. No.: 243,812

[30] Foreign Application Priority Data
Apr. 15, 1971 Great Britain..................... 9,535/71

[52] U.S. Cl. ............................................. 280/430
[51] Int. Cl. ............................................. B62d 53/12
[58] Field of Search .... 280/427, 428, 429, 430, 435

[56] References Cited
UNITED STATES PATENTS

| | | | |
|---|---|---|---|
| 1,935,112 | 11/1933 | Connors | 280/430 |
| 1,400,752 | 12/1921 | Land | 280/428 |
| 1,766,780 | 6/1930 | Finch | 280/428 |
| 2,418,240 | 4/1947 | Starr | 280/430 |
| 3,456,962 | 7/1969 | Swepa | 280/430 |

*Primary Examiner*—Leo Friaglia
*Assistant Examiner*—T. L. Siemens
*Attorney, Agent, or Firm*—L. Rosen et al.

[57] ABSTRACT

A road-haulage semi-trailer having a sliding king-pin for lifting the landing legs to the retracted position, the landing legs being spring-biassed towards the retracted position and coupled to the king-pin through a rack and pinion to give rapid lifting of the legs with a small king-pin movement. The king-pin is disengageable to move independently of the landing legs over a large distance between front and rear clamps which enable it to be locked in either a front or a rear position for travelling.

9 Claims, 4 Drawing Figures

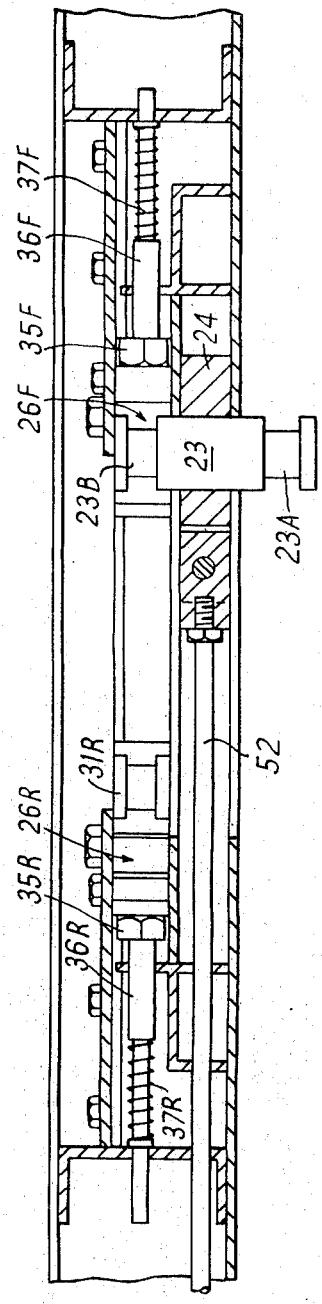

KING-PIN ACTUATED LANDING GEAR FOR ROAD-HAULAGE SEMI-TRAILERS

The present invention relates to road-haulage trailers of the type which are drawn by a tractor which supports the front end of the trailer, and which are commonly referred to as semi-trailers.

It is usual for the coupling between the tractor and the trailer to be made by means of a king-pin which is fixed to the trailer and projects downwardly from the trailer and is engaged by a clamp or fifth-wheel coupling on the tractor. When the tractor is removed the trailer is supported by landing wheels carried by legs depending from the trailer and provision is usually made for adjusting the vertical height of the legs or swinging the legs backwards a short way to lift the wheels clear of the ground when the trailer is on the road.

Especially for the very large trailers used for carrying containers the overall length of the tractor and trailer becomes a problem because of safety regulations. For this reason it is desirable for the tractor to run back as far as possible under the trailer but this means displacing the landing legs towards the rear to avoid the tractor fouling the legs when turning. This gives rise to the danger of "nose-diving" or tipping forward when the tractor is removed because a large part of the weight of the load is forward of the landing wheels.

In U.S. Patent Specifications Nos. 2,418,240 and 3,456,962 there are described semi-trailers in which the landing legs can be retracted by means of a sliding king-pin which is driven rearwards by the tractor or truck after engagement of the fifth-wheel coupling. Locking mechanisms are provided for holding the landing legs in the retracted position and in the operative position. These constructions do allow the landing legs to be placed further forward on the trailer but they do not allow trailers with a long rearward extension, for example, three-axle tractors, to be used because these will still foul the legs before the legs have been fully retracted. Moreover, the retraction of the legs requires the full movement of the sliding king-pin from the front to the rear position and this increases the risk of fouling the legs during retraction and requires that the tractor supports the semi-tractor at a point some distance to the rear of the front part of the trailer, as a result of which a substantial part of the load may still be forward of the point of support.

It is an object of the present invention to achieve full retraction of the legs by a short travel of the sliding king-pin.

In accordance with the invention this is achieved in that the landing legs are mounted on a transverse shaft mounted in pivotal supports on the frame of the semi-trailer and the transverse shift carries a pinion which is in mesh with a rack displaceable by the sliding king-pin.

A further important feature is the provision of a releasable coupling between the king-pin and the landing legs which allows completion of the movement of the king-pin to its rear position after the short movement necessary for retraction of the legs. Preferably also the king-pin can be disengaged from the landing legs when moving forwards so that the trailer can be towed by the tractor with the king-pin locked in its forward position and the landing legs fully retracted.

To facilitate the lifting of the legs to the retracted position by the rack and pinion they can be biassed by springs towards the retracted position, the bias serving the counteract the weight of the landing legs and wheels.

For securing the sliding king-pin in its front and rear positions, front and rear clamps are mounted on the trailer to engage with the upper end of the king-pin, the lower end serving for attachment to the tractor. An important feature of the invention is the provision of an interlock mechanism between the front and rear clamps which comprises locking members for each clamp and means for disengaging either one of the locking members while leaving the other locking member ready to engage when the open jaws of its clamp are closed by movement of the king-pin into the jaws.

Figure 2:
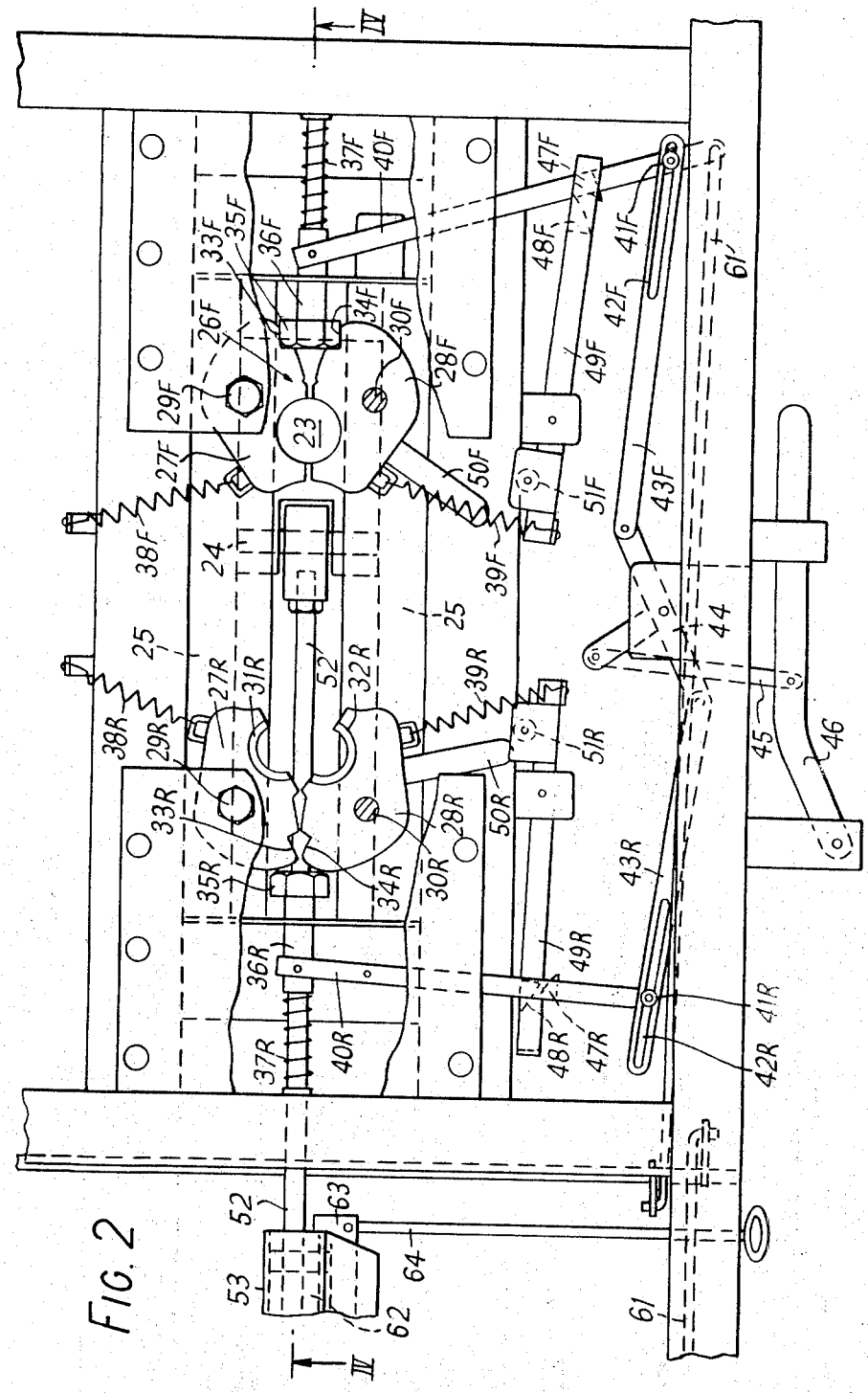
Figure 3:
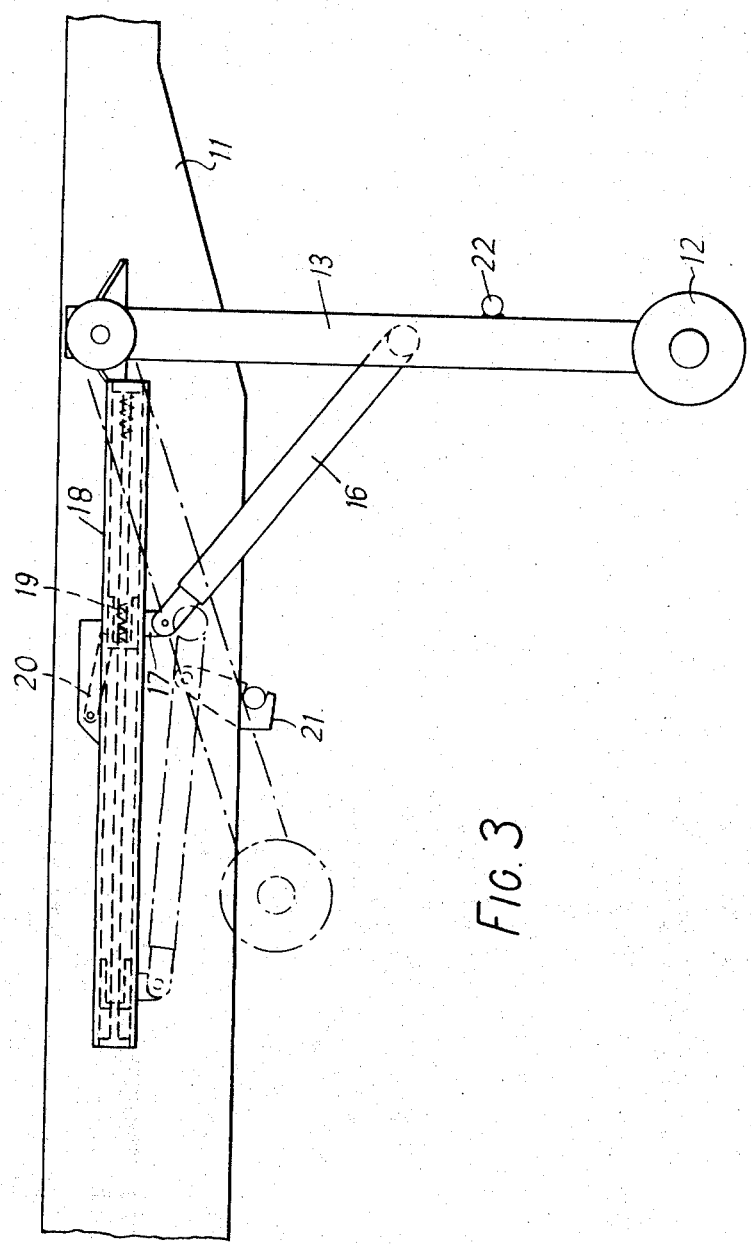

The invention will now be described in more detail with the aid of an example illustrated in the accompanying drawings, in which:

FIG. 1 is a plan view of the front end of a semi-trailer forming a preferred embodiment of the invention, FIG. 2 is a detail of FIG. 1 on a larger scale, with parts broken away, FIG. 3 is a side elevation of the retractable landing wheels and legs of the trailer of FIG. 1, and FIG. 4 is a section on the line IV—IV of FIG. 2.

The trailer shown in the drawings has a frame of conventional construction with side members 10 and 11 braced by cross-beams. The rear end of the trailer (beyond the left-hand side of FIG. 1) is supported by road wheels in conventional manner. Towards the front end of the trailer a pair of landing wheels 12 are carried by landing legs 13 which are secured to a shaft 14 which is mounted in bearings 15 attached to the side members 10 and 11. Each of the legs 13 has a strut 16 (FIG. 3) pivotally attached near the mid-point of the leg and the other end of the strut 16 is pivotally attached to a slider 17 which runs in a guide channel 18 attached to one of the side members of the frame. A compression spring 19 acting on the slider 17 provides the power for retraction of the wheel 12 and leg 13 from the supporting position shown in full lines to the retracted position shown in broken lines and supports a major part of the weight of the landing wheel and leg in the retracted position. A spring-loaded latch 20 engaging the slider 17 holds each landing leg 13 in its supporting position and in the retracted position of the legs they are held by a locking device 21 which hooks on to a cross member 22 extending between the legs 13. Only a minor part of the weight of the landing wheels and legs falls on the locking device 21 since the rest is counteracted by the springs 19.

Between the side members 10 and 11 of the frame at the front end of the trailer a king-pin 23 is fixed in a block 24 which is slidable between guides 25 to move the king-pin between front and rear positions. The block is of large dimensions and the guides are of substantial construction to ensure smooth sliding under load and provision is made for greasing the sliding surfaces. The king-pin 23 has a lower end 23A which is engageable by a clamp mounted on a fifth-wheel plate of a tractor (not shown) and an upper end 23B which can engage with either a front clamp 26F or a rear clamp 26R on the trailer. The front and rear clamps and associated parts are of the same construction except that the front clamp faces rearwards and the rear clamp forwards. The parts of the two clamps are therefore given the same references with the suffixes F (front) and R (rear) being used where it is necessary to distinguish between them.

Each of the clamps 26 comprises a pair of jaws 27 and 28 mounted on pivots 29 and 30, respectively, and having semi-circular recesses 31 and 32, respectively, for engagement around the upper end 23B of the king-pin. At the side of the pivots remote from the recesses 31 and 32 the jaws 27 and 28 have notches 33 and 34, respectively, which are engageable by a head 35 of a locking member 36 to hold the jaws in engagement with the king-pin. Each locking member 36 is biassed by a spring 37 towards engagement between the notches 33 and 34 of the jaws 27 and 28. The jaws 27 and 28 are biassed towards the open position by springs 38 and 39, respectively.

Each locking member 36 can be disengaged from the jaws to allow the clamp to open by means of a lever 40. The levers 40F and 40R carry pins 41F and 41R running in slots 42F and 42R in links 43F and 43R which are pivotally attached to opposite arms of a common double bell-crank lever 44. The third arm of the lever 44 is coupled by a link 45 to an operating lever 46 mounted on the outside of the frame of the trailer. Pulling out of the lever 46 by the operator serves to open whichever of the two clamps is closed, in this case the front clamp 26F, by withdrawing the locking member 36. The slot 42R provides a lost-motion connection to the pin 41R and hence the locking member 36R remains in the position shown, with its head 35R resting against the ends of the open jaws 27R and 28R. When the locking member 36F is withdrawn a stop 47F on the lever 40F engages behind a detent 48F on a latch lever 49F to prevent re-engagement of the locking member. The latch lever 49F is pivotally mounted on the frame and its other end is connected by spring 39F to the jaw 28F. An arm 50F to the jaw 28F engages a roller 51F on the latch lever 49F when the jaws are fully open, thereby tripping the latch to force the locking member 36F to take up a position corresponding to that shown for the locking member 36R.

The king-pin 23 begins in the forward position shown with its upper end 23B held by the clamp 26F, the jaws of the clamp 26R being open. When the lower end 23A of the king-pin has been engaged by the clamp of the tractor, the operator pulls out the hand lever 46 to open the clamp 26F and the tractor then slides the king-pin 23 from the front clamp 26F to the rear clamp 26R. As the upper end 23 of the king-pin engages the recesses 31R adn 32R in the jaws of the rear clamp it causes the jaws 27R and 28R to close around it and the head 35R of the locking member 36R springs into the notches 33R and 34R to lock the rear clamp, thus securing the king-pin in the new position. The front clamp remains open until the process is reversed by actuation of the hand lever 46 to open the rear clamp.

A rod 52 is pivotally coupled to the sliding block 24 in which the king-pin 23 is mounted and extends longitudinally along the centre-line of the trailer. The rod 52 passes through a tubular member 53 to which is attached a rack 54 which engages a pinion 55 fixed to the shaft 14 which carries the landing legs. Rearward movement of the tubular member 53 will cause the landing legs 13 to swing to their retracted position. The member 53 has two arms 56 pivotally mounted on its outer surface and having projections 56P which pass through slots in the wall of the member 53 and are engaged by a flange 57 on the rod 52. The arms 56 are biassed outwardly away from the tube by springs 58 but over a short range of movement of the tubular member 53 the projections 56P are held in engagement with the flange 57 by rollers 59 mounted on a cross-member 60 of the frame. Thus during the initial rearward movement of the rod 52 resulting from sliding of the king-pin out of the front jaws, the rod 52 moves the tubular member 53 to effect retraction of the landing legs 13. Subsequently, the rod is free to move through the member 53. The locking device 21 is operated by the tubular member 53 through a lost-motion connection as the landing legs rise into the fully-retracted position. To allow retraction of the legs 13 the latch 20 must first be disengaged and this is done by a cam operated by a linkage 61 coupled to the lever 40F so that the latch 20 is released when the front jaws 26F are opened.

Behind the flange 57 a guide bush 62 surrounds the rod 52 and is slidable within the tubular member 53. The bush 62 is normally held against forward displacement in the member 53 by a stop 63 so that as the rod 52 is drawn forwards the member 53 is carried with it to lower the landing legs as the king-pin 23 enters the front pair of jaws 26F. The stop 63 can be disengaged by a pull-rod 64 to allow the king-pin 23 to be locked in the front jaws 26F without the landing legs 13 being lowered. It is then possible for the trailer to be hauled with the king-pin in the front position.

I claim:

1. In a road-haulage semi-trailer having a sliding king-pin lockable in front and rear positions on the frame of the semi-trailer and coupled to the landing legs supporting the forward end of the trailer frame to effect retraction of the legs when the king-pin is slid rearwards by engagement with the tractor, said legs being carried by a transverse shaft mounted in pivotal supports mounted on the frame, the improvement which comprises a pinion mounted on said transverse shaft and secured for rotation therewith, a rack coupled to the sliding king-pin and engageable with the pinion to swing the landing legs to the retracted position upon displacement of the rack by the king-pin, and means for disengaging the king-pin from the landing legs to allow movement of the king-pin to the forward position with the legs in the retracted position.

2. A road-haulage semi-trailer comprising a frame, landing legs pivotally mounted on said frame for swinging movement about a pivot axis, a pinion mounted on said landing legs with its axis of rotation coincident with the pivot axis, a rack engaging said pinion to swing said legs from a supporting to a retracted position, spring means biassing said legs to the retracted position, a king-pin slidably mounted on said frame for movement between front and rear positions, a releasable coupling connecting said king-pin to said rack, front and rear clamps mounted on said frame and engageable with the king-pin to lock the king-pin in the front and rear positions respectively, and an interlock mechanism coupling said front and rear clamps.

3. A semi-trailer as claimed in claim 2 having a slider mounted for movement longitudinally on said frame, and a strut pivotally connected at one end to the slider and at the other end to the landing legs, said biassing spring means acting upon said slider.

4. A semi-trailer as claimed in claim 2 having a locking device for securing the landing legs in the retracted position, said locking device being connected for operation by movement of said rack.

5. In a road haulage semi-trailer having a sliding king-pin lockable in front and rear positions on the frame of the semi-trailer and coupled to the landing legs supporting the forward end of the trailer frame to effect retraction of the legs when the king-pin is slid rearwards by engagement with the tractor, said legs being carried by a transverse shaft mounted in pivotal supports mounted on the frame, the improvement which comprises a pinion mounted on said transverse shaft and secured for rotation therewith, a rack coupled to the sliding king-pin and engageable with the pinion to swing the landing legs to the retracted position upon displacement of the rack by the king-pin, a releasable coupling between the king-pin and the landing legs, and means for holding said coupling in engagement during retraction of the landing legs and thereafter releasing said coupling to allow further movement of the king-pin to its lockable rear position.

6. In a semi-trailer as claimed in claim 5 said releasable coupling comprising a tubular member fixed to the rack, a flanged member coupled to the king-pin and displaceable within the tubular member, latch arms pivotally mounted on the tubular member and engageable with the flanged member, and biassing means biassing said latch arms agianst engagement with the flanged member, and said holding and releasing means comprising guides fixed to the frame and co-operating with the latch arms over a limited range of travel of said tubular member to hold said arms in engagement with the flanged member.

7. In a semi-trailer as claimed in claim 5, springs biassing the landing legs towards the retracted position.

8. In a semi-trailer as claimed in claim 5, front and rear clamps mounted on the frame and engageable with the king-pin to lock it in the front or rear position, respectively.

9. In a semi-trailer as claimed in claim 8 an interlock mechanism coupling the front and rear clamps, said interlock mechanism comprising front and rear locking members for co-operation with the front and rear clamps, respectively, to hold said clamps in the locked position, and means for disengaging one of the locking members while leaving the other locking member ready to engage when the open jaws of its clamp are closed by movement of the king-pin into the jaws.

* * * * *

UNITED STATES PATENT OFFICE
CERTIFICATE OF CORRECTION

Patent No. 3,790,190           Dated February 5, 1974

Inventor(s) Carlton John Davis

It is certified that error appears in the above-identified patent and that said Letters Patent are hereby corrected as shown below:

On the cover sheet insert -- [73] Assignee: Trailer Systems Limited, Rainham, Essex, England --.

Signed and sealed this 1st day of October 1974.

(SEAL)
Attest:

McCOY M. GIBSON JR.
Attesting Officer

C. MARSHALL DANN
Commissioner of Patents